Patented July 25, 1944

2,354,206

UNITED STATES PATENT OFFICE 2,354,206

FUNGICIDE

Marion C. Goldsworthy, Takoma Park, Md., assignor to Claude R. Wickard, as Secretary of Agriculture of the United States of America, and his successors in office No Drawing. Application November 7, 1942, Serial No. 464,862

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

My invention relates to fungicides, and one of its objects is the provision of a material that exerts a superior fungicidal effect and one that does not in any way injure plants on which it may be sprayed, dusted or painted.

Another object of my invention is to provide fungicidal materials that in no way complicate the usual procedure for the preparation of spray fluids, dusts, or pastes, and that are reasonable in price and easily manufactured.

I have found phthalic diphenyl guanidine, a substituted guanidine, formed by the combination of two molecules of diphenyl guanidine and one molecule of phthalic acid, to possess superior fungicidal effects. When ground to a very fine powder, phthalic diphenyl guanidine is white in color, odorless, non-hygroscopic, insoluble in benzene, gasoline or water, but soluble in alcohol, and has a melting point of 178° C., a flash point above 120° C., and a specific gravity of 1.20.

Phthalic diphenyl guanidine has repeatedly proven toxic to the spores of fungi causing apple scab, apple bitter rot, peach brown rot, and peach scab in laboratory and field tests without causing injury to the plants sprayed.

Phthalic diphenyl guanidine when combined with lime, or with bentonite, or with both lime and bentonite, in the proportions of two pounds of phthalic dipenyl guanidine to four pounds of lime or two pounds of bentonite, or with the stated quantities of both lime and bentonite, and added to 100 gallons of water, forms a spray compound that is toxic to the spores of the apple scab, apple bitter rot, peach brown rot, and peach scab organisms.

Phthalic diphenyl guanidine mixes or combines readily with lime, calcium carbonate, talc, bentonite, clay, fuller's earth, or a combination of these to form a fungicidal mixture to which may be added a spreader, such as soap, casein or any synthetic aliphatic sulfonate, or an adhesive, such as natural fats or waxes, synthetic fats or waxes, mineral or vegetable oils, gums, natural and synthetic resins, glue or paints. These combinations of materials, when dry, are suitable for dusting plants for the control of fungous diseases, and when wetted are efficient fungicidal suspensions, pastes, or paints.

The use of phthalic diphenyl guanidine as a fungicide is not restricted to any particular amount in combination with other materials. Any amount of phthalic diphenyl guanidine may be used with lime or bentonite, or both, in water, to form a spray compound, and any amount may be combined with lime, calcium carbonate, talc, bentonite, clay, fuller's earth, or a combination of these, and a spreader or adhesive in the preparation of a fungicidal dust, suspension, paste, or paint.

Having thus described my invention, I claim:

1. A fungicidal composition comprising phthalic diphenyl guanidine and at least one member of the group consisting of lime, calcium carbonate, talc, bentonite, clay, and fuller's earth.

2. A fungicidal spray composition comprising an aqueous suspension of a mixture of phthalic diphenyl guanidine and at least one member of the group consisting of lime and bentonite.

3. The process of combatting fungous diseases which comprises treating hosts for fungi with a fungicidal composition containing as an essential active ingredient phthalic diphenyl guanidine.

MARION C. GOLDSWORTHY.